United States Patent

[11] 3,559,945

| [72] | Inventors | Ronald W. Coiner<br>Irwin;<br>Donald Brown, Monroeville, Pa. |
|---|---|---|
| [21] | Appl. No. | 819,785 |
| [22] | Filed | Apr. 28, 1969 |
| [45] | Patented | Feb. 2, 1971 |
| [73] | Assignee | Westinghouse Air Brake Company<br>Wilmerding, Pa.<br>a corporation of Pennsylvania |

[54] DIAPHRAGM OPERATED FLUID LOGIC VALVES
10 Claims, 5 Drawing Figs.

[52] U.S. Cl. ..................................... 251/61.2,
235/201; 251/75
[51] Int. Cl. ...................................... F16k 11/10,
F16k 31/385
[50] Field of Search.......................... 251/61,
331, 65, 75; 235/200, 201

[56] References Cited
UNITED STATES PATENTS

| 2,712,427 | 7/1955 | Welborn et al. | 251/75X |
| 2,991,805 | 7/1961 | Page | 251/65X |
| 3,319,644 | 5/1967 | Thorburn | 137/85 |
| 3,407,833 | 10/1968 | Brandenberg | 235/201X |
| 3,463,442 | 8/1969 | Leskiewicz et al. | 251/61.2 |

Primary Examiner—Henry T. Klinksiek
Attorneys—Adelbert A. Steinmiller and Ralph W. McIntire, Jr.

ABSTRACT: A diaphragm-operated logic valve, in which, a Belleville-type spring biases a valve operator in a first axial direction, and a first diaphragm, when subjected to a control pressure, overcomes the spring bias whereupon the valve operator is moved by way of snap action of the spring in the opposite axial direction. A second diaphragm, captured at its outer periphery between a pair of housing sections to form a seal, includes a central portion, one side of which is engaged by the valve operator and sealingly overlies the bore in which the valve operator is disposed for movement, and the other side of which overlies a valve seat in a cavity to serve as a valve which engages the valve seat when the valve operator is moved by the control pressure on the first diaphragm. In a modification, the other side of the second diaphragm may carry an auxiliary operator which controls operation of a third diaphragm as a valve.

PATENTED FEB 2 1971 3,559,945

INVENTOR.
RONALD W. COINER
DONALD BROWN
BY Ralph W. McIntire, Jr.
ATTORNEY

DIAPHRAGM OPERATED FLUID LOGIC VALVES

BACKGROUND OF INVENTION

Heretofore, it has been proposed to provide logic valve devices with a diaphragm valve operator for adapting such devices for operation over a wide range of control and supply pressures normally encountered in a wide variety of pressure-operated mechanisms with which they are intended to be associated, thereby comprising an improvement over pure fluid devices which require constant drain on supply fluid and which also require interface valve devices to enable control by low control pressures of high capacity valves utilized for controlling high operating pressures.

These devices have been successful but are deficient in the lack of ability to switch from one state to the other complimentary state without hesitation as control pressures build or decay.

It is the object of this invention to provide a simply constructed diaphragm operated logic valve device of relatively few parts capable of switching states without hesitation at predetermined control pressures.

SUMMARY OF INVENTION

In the present invention, this object is achieved by providing in a first cavity, formed between a first and second adjacent section of a sectional valve housing, a first diaphragm captured at its outer periphery between the sections to form a seal, and having the central portion thereof dividing the cavity into a control pressure chamber in the first housing section and an atmospheric pressure chamber in the second housing section. A through bore in the second section opens at one end at the atmospheric pressure chamber, and opens at the other end at the face of the second housing section opposite the atmospheric pressure chamber to overlie a cavity in a third housing section adjacent the second housing section. A valve operator is disposed for axial movement in the through bore with radial clearance and is engaged at its upper end by the first diaphragm for axial movement into the second cavity in response to control pressure in the control pressure chamber. A second diaphragm, captured at its outer periphery between the second and third sections to form a seal, includes a central portion having one face sealingly overlying the other end of the through bore and engaged by the lower end of the valve operator, and having an opposite face serving as a valve, or carrying an auxiliary valve operator to operate a separate valve to seat or unseat relative to an inlet valve seat in the second cavity in response to downward movement of the valve operator. A Belleville-type spring in the atmospheric chamber is engaged at its outer periphery with a shoulder in the atmospheric chamber, and is engaged at its inner periphery with the upper end of the valve operator to bias the valve operator in the upward direction in yieldable opposition to control pressure in the control pressure chamber.

The foregoing invention with modifications, may be utilized to perform each of the logic functions NOT, NOR, AND, and OR.

This and other objects of the invention will become more readily apparent in the following description, taken with the drawing in which.

Figure 1:
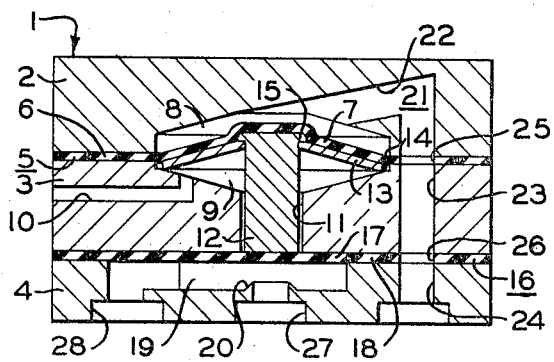
FIG. 1 is a cross-sectional view of a NOT valve device, showing my invention.

Referring now to FIG. 1 of the drawing, the first embodiment of the invention is shown in a NOT valve, that is, comprising a sectionalized housing 1 having an upper section 2, an intermediate section 3, and a bottom section 4, all having identical outer peripheries of any desired form, for example, circular or polygonal.

A single integral resilient member generally indicated at 5, serves as a composite seal and diaphragm member, extending completely across and disposed between the adjacent faces of housing sections 2 and 3. The outer portion 6 of member 5 is captured between the faces to serve as a seal between housing sections 2 and 3, and the inner portion 7 thereof serves as a diaphragm. The diaphragm portion 7 serves as a movable divider between a control pressure chamber 8 formed by a depression in the lower face of housing section 2, and an atmospheric pressure chamber 9 formed by an opposing depression in the upper face of housing segment 3.

Housing section 3 includes a radially extending passage 10 communicating atmospheric pressure chamber 9 with atmosphere, and further includes an axial through bore 11 communicating atmospheric pressure chamber 9 with the lower face of housing section 3.

A valve operator 12 is disposed for axial reciprocable movement, with radial clearance in the through bore 11, with the upper end of the operator engaged with the lower face of diaphragm portion 7 of member 5. A Belleville-type spring member 13 is disposed in atmospheric pressure chamber 9 to bias operator 12 to its upper limit of movement, the outer periphery of which axially engages a peripheral shoulder 14 in atmospheric pressure chamber 9, and the inner periphery of which is engaged with the underside of a flange 15 on the upper end of valve operator 12.

A single unitary resilient member 16, serving as a composite seal and valve member, extends fully across, and is disposed between, the adjacent faces of housing sections 3 and 4. The outer portion 17 of member 16 is sealingly captured between housing sections 3 and 4. The inner portion 18 has its lower face overlying an inlet pressure chamber 19 formed by a depression in the upper face of housing section 4 opposite the lower end of through bore 11, and has its upper face engaged with the lower end of operator 12 and overlying the lower end of through bore 11 to prohibit both fluid and pressure communication between inlet pressure chamber 19 and atmospheric pressure chamber 9. The lower face of inner portion 18 also serves as a valve member, which, when urged downwardly in response to downward movement of operator 12, seats upon an inlet valve seat 20 in inlet pressure chamber 19 disposed coaxially opposite operator 12.

The sectional housing 1 includes a control pressure passage, generally indicated at 21, and comprised of registered passage segments 22, 23 and 24 in housing sections 2, 3 and 4, respectively. One end of passage segment 22 communicates with control pressure chamber 8. One end of passage segment 24 communicates with the bottom face of housing section 4. Passage segment 23 communicates at its end with the other end of each passage segment 22 and 24 by way of suitable apertures 25 and 26 in the outer portions of resilient members 5 and 16, respectively.

Lower housing section 4 further includes on the bottom face thereof an inlet port 27 communicating with inlet valve seat 20, and an outlet port 28 laterally communicating with inlet pressure chamber 19, thus adapting the valve device for convenient installation on a mounting bracket or subplate, not shown, having suitable fluid passages therein communicating with the inlet port 27, the outlet port 28, and the control pressure passage segment 24. The housing sections 2, 3 and 4 and the resilient members 5 and 16 may be held in fluid tight relationship, as shown, by any suitable means, such as screws, not shown.

In now describing the operation of the NOT valve device of FIG. 1, it will first be assumed that no control pressure is present in control pressure passage 21 and that supply pressure is applied to inlet port 27. Under these conditions, control pressure chamber 8 is depressurized so that valve operator 12 assumes the upper limit position, as shown, under the bias of Belleville spring 13.

If now control passage 21 is pressurized, the pressure in control pressure chamber 8 correspondingly increases until sufficiently large to overcome the inherent bias of Belleville spring 13 at a predetermined pressure level governed by the particular design of the spring, whereupon the spring yields, and, upon passing overcenter in its downward movement, forcibly snaps the valve operator 12 downwardly to seat the lower face of diaphragm portion 18 on valve seat 20, thereby terminating the flow of supply to outlet 28. It is seen that the Belleville spring 13 avoids a slow pinching off of supply by allowing only a minimum movement of operator 12 until moved downwardly beyond its center position, whereafter the full pressure load in control pressure chamber 8 is effective to seat the diaphragm portion 18 on the valve seat 20.

If now, the control pressure in control passage 21 is reduced to a predetermined point, as governed by the spring design, the inherent bias in the Belleville spring will snap the operator 12 upwardly to its normal initial position, whereupon the diaphragm 18 will unseat relative to supply pressure thereunder to recommunicate supply pressure with the outlet passage 28.

Figure 2:
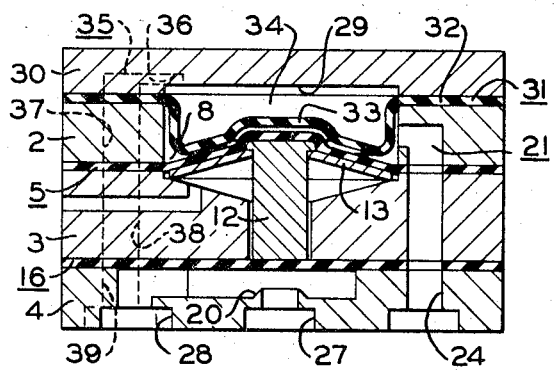
FIG. 2 is a cross-sectional view of a second embodiment showing a NOR valve device.

Referring now to FIG. 2 of the drawing, there is shown the second embodiment of the invention comprising a NOR valve device, that is, a valve device for pressurizing an output only when neither of two inputs are pressurized.

In the NOR device, device of FIG. 2, the housing sections 3 and 4, resilient members 5 and 16, the operator 12 and Belleville spring 13 are substantially identical in structure, relative disposition and function to those described in FIG. 1, and accordingly these parts have been given reference numerals identical to the corresponding parts of FIG. 1 for simplicity of description.

The NOR valve device of FIG. 2 differs from the NOT valve of FIG. 1 in that the control pressure chamber 8 opens at the top of housing section 2 in opposed mating relationship with a depression 29 in an additional upper housing section 30, forming a cavity in the housing. A resilient member generally indicated at 31 is disposed between and extends fully across the adjacent faces of housing sections 2 and 30, with the outer peripheral portion 32 thereof serving as a seal between housing section 2 and 30, and with the inner portion 33 thereof separating an upper control pressure chamber 34 from lower control pressure chamber 8 previously described in FIG. 1 of the drawing. Upper control pressure chamber 34 communicates with an end section of a second control pressure passage generally indicated at 35, comprised of passage segments 36, 37, 38 and port 39 in housing sections 30, 2, 3 and 4, respectively, the control pressure inlet port 39 opens to the lower face of housing section 4.

In now describing the operation of the NOR valve device of FIG. 2, it will be readily apparent that a control pressure in either of control pressure passages 21 or 35 will provide a pressure in control pressure chambers 8 or 34, respectively, to urge valve operator 12 downwardly against the bias of Belleville spring 13 to seat portion 18 of resilient member 16 with snap action upon supply valve seat 20 to stop supply flow to outlet 28. Conversely, upon release of the control pressure so applied, the operator 12 and portion 18 will recommunicate supply port 27 with outlet port 28.

Figure 3:
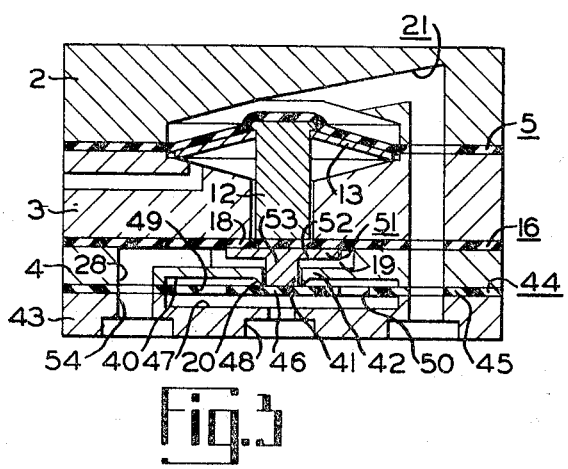
FIG. 3 is a cross-sectional view of a third embodiment, showing an AND valve device.

Referring now to FIG. 3 of the drawing, there is shown a third embodiment of the invention comprising an AND valve device, that is, a valve device which provides an output pressure only when control pressure is present at both of two control inputs.

In the AND valve device of FIG. 3, the housing sections 2 and 3, the resilient members 5 and 16, and the Belleville spring 13 controlling operation of the valve operator 12 are identical to the corresponding parts above described in FIG. 1, and accordingly have been assigned reference numerals identical to the corresponding parts of FIG. 1 to simplify the description.

The AND valve of FIG. 3 differs from the NOT valve of FIG. 1 in that the supply valve seat 20 is disposed in and protrudes downwardly from the bottom of an additional depression 40 on the lower face of housing section 4 and is communicated with previously described supply pressure chamber 19 via a through bore 41 extending axially through an integral rigid divider 42 separating supply chamber 19 from depression 40, the through bore being disposed in coaxial alignment with valve operator 12. An additional lower housing section 43 is disposed adjacent previously described lower housing section 4, and is separated therefrom by a resilient member generally indicated at 44, extending fully across the adjacent faces of housing sections 4 and 43. The outer portion 45 of resilient member 44 is captured between sections 43 and 4 to provide a seal therebetween. The inner portion 46 of the resilient member 44 centrally overlies depression 40 and valve seat 20, the upper face of portion 46 serving as a valve seatable on the valve seat 20, as shown. The lower face of inner portion 46 opposes an inlet port 48 disposed in depression 47 in housing section 43. The inner portion 46 of resilient member 44 includes a plurality of apertures 49, 50 axially extending therethrough radially outwardly of the central valve portion thereof to intercommunicate depressions 47 and 40, which depressions together comprise an auxiliary supply pressure chamber.

An auxiliary valve operator, generally indicated at 51, comprises a flange 52, attached in any suitable manner, as by bonding, to the lower face of portion 18 of resilient member 16, and further comprises an integral extension 53 axially extending into through bore 41 for reciprocable movement with valve operator 12 and portion 18 of resilient member 16, and for correspondingly reciprocably moving the inner portion 46 of resilient member 44. A passage section 54 in housing section 43 axially registers with outlet passage 28 in housing section 4 via a suitable aperture in resilient member 44.

In now describing the operation of the AND valve device of FIG. 3, it will be apparent that if a control pressure is applied in control passage 21 while input passage 48 is depressurized, valve operator 12 and auxiliary valve operator 51 are urged downwardly to unseat central portion 46 of resilient member 44 relative to supply valve seat 20. Since inlet port 48 is depressurized, the auxiliary inlet chamber is likewise depressurized so that no pressure is provided at outlet port 54. Conversely, if inlet port 48 is pressurized by a control pressure while control pressure port 21 is depressurized, inner portion 46 of resilient member will remain seated on valve seat 20, thereby maintaining the outlet port 54 in a depressurized condition. Although under these conditions the auxiliary pressure chamber is pressurized throughout via the apertures 49, 50 in the resilient member 44, the force on the lower face of resilient member 44 exceeds that on the upper face thereof as diminished by the area of the upper face overlying the valve seat 20, so that the valving portion of resilient member 44 remains seated because of the differential pressure acting upwardly.

If now control pressure is simultaneously applied to control pressure passage 21 and inlet port 48, valve operator 12 and follower 51 will be snapped downwardly unseating inner portion 46 relative valve seat 20 to pass control pressure in port 48 via through bore 41 to outlet port 54.

Figure 4:
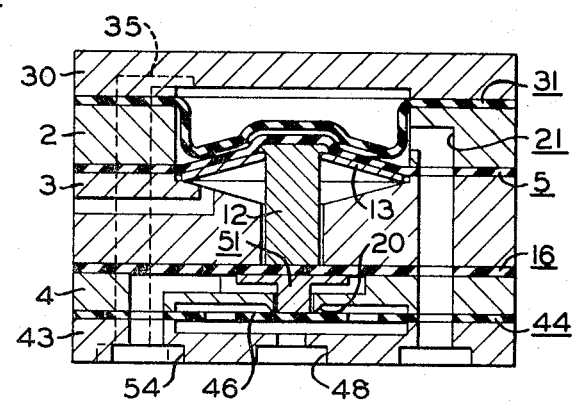
FIG. 4 is a cross-sectional view of a fourth embodiment, showing an OR valve device.

Referring now to FIG. 4 of the drawing, there is shown a fourth embodiment of the invention in the form of an OR valve device, that is, a valve device which provides pressure at an output passage in response to control pressure applied to either of two control input passages.

The OR valve device of FIG. 4 is, in its entirety a combination of some of the elements of FIG. 2 with some of the elements of FIG. 3, in which housing sections 30, 2 and 3, resilient members 31, 16 and 5, Belleville spring 13 and operator 12 are identical to the corresponding elements of FIG. 2, while housing sections 4 and 43, follower 51 and resilient member 44 are identical to corresponding elements of FIG. 3. The elements of FIG. 4 having counterparts in FIGS. 2 and 3 have been assigned corresponding reference numerals.

In now briefly describing the operation of the OR valve device of FIG. 4, it will be apparent that if control pressure is applied to either of control pressure passages 21 or 35, a downwardly acting force is applied to urge operator 12 and follower 51 downwardly to unseat inner portion 46 of resilient member 44 relative valve seat 20, thus permitting supply pressure in port 48 to pressurize outlet port 54. Conversely, in the absence of control pressure in both control pressure passages 21 and 35, supply pressure in port 48 maintains inner portion 46 of resilient member 44 seated on valve seat 20 in the manner hereinbefore described relative to FIG. 3.

Figure 5:
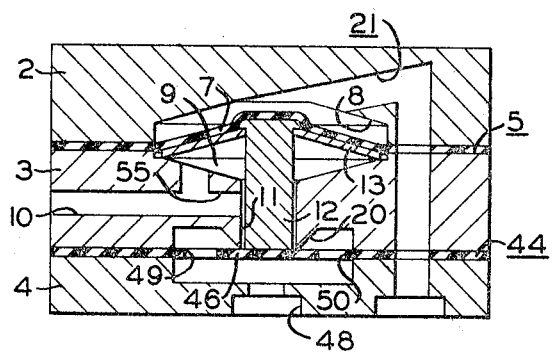
FIG. 5 is a cross-sectional view of a fifth embodiment, showing an exhaust valve in the form of a NOT valve device.

Referring now to FIG. 5, there is shown a fifth embodiment of the invention as an exhaust valve device for communicating an exhaust passage to atmosphere only when a control pressure is present in a control pressure passage. In function, the device operates as a single input OR valve to provide an output pressure only when a control pressure is present.

In the exhaust valve, housing section 2, resilient member 5, Belleville spring 13 and valve operator 12 are identical to corresponding members hereinbefore described in FIG. 1, while resilient member 44 is identical to corresponding resilient member in FIG. 3, which corresponding members have been assigned identical reference numerals.

In housing section 3, the atmospheric passage 10 is directly communicated with through bore 11 via branch passage for more rapid exhaust function, as hereinafter described. In addition, valve seat 20 is disposed in a depression in the lower face of housing section 2 for direct coaxial communication with the lower end of through bore 11.

In now describing the operation of the exhaust valve of FIG. 3, it will be assumed that inlet port 48 is communicated with a pressurized volume to be exhausted to atmosphere, in which event inner portion 46 of resilient member 44 will be urged upwardly into seating engagement with valve seat 20, as shown. If now control pressure passage 21 is pressurized, valve operator 12 will be urged downwardly, in the manner previously described, to unseat inner portion 46, whereupon fluid under pressure in port 48 will pass through apertures 49, 50 into through bore 11, branch passage 55 and atmospheric passage 10. Inasmuch as the volume being exhausted will quickly lose pressure, the momentary surge of exhaust pressure in atmospheric pressure passage 10 and chamber 9 will act on the under surface of belleville spring 13 and diaphragm 7 for a time insufficient to urge the operator upwardly.

We claim:
1. A valve device, comprising:
a. a housing having first and second cavity means therein;
b. a first diaphragm dividing said first cavity means into a control pressure chamber and an atmospheric pressure chamber;
c. a valve seat in said second cavity means;
d. a valve in said second cavity means movable from a seated to an unseated position relative to said valve seat, and vice versa, and normally assuming one of said seated and unseated positions;
e. a bore in said housing;
f. reciprocably movable valve operator means in said bore and having one end disposed in said atmospheric chamber concentrically engaged with said diaphragm; and
g. a Belleville spring in said atmospheric pressure chamber disposed to bias said valve operator means and said diaphragm to a limit position in a direction opposing pressure in said control pressure chamber; and the other end of said operator means disposed for movement in said second cavity means in response to pressure in said control pressure chamber overriding the bias of said Belleville spring to dispose said valve in the other of said seated and unseated positions.

2. A valve device, as recited in claim 1, in which:
a. said housing is comprised of at least two housing sections, each having a face adjacent the other;
b. each said face including a depression opposite the other which together comprise said first cavity means; and
c. a resilient member extending between and fully across said two housing sections, with the outer peripheral portion thereof tightly disposed between and in sealed relationship with said faces, and with the integral inner portion thereof comprising said diaphragm.

3. A valve device, as recited in claim 1, in which:
a. one end of said bore opens to said atmospheric chamber, and the other end thereof opens to said second cavity means through said valve seat;
b. an inlet port in said second cavity means;
c. a second diaphragm in said second cavity means and having a first and a second portion;
d. said second diaphragm dividing said second cavity means into a third and fourth chamber;
e. said first portion overlying said valve seat and comprising said valve; and
f. said second portion having aperture means therethrough intercommunicating said third and said fourth chambers.

4. A valve device, comprising:
a. a housing having a first cavity means and a second cavity means therein;
b. a first diaphragm dividing said first cavity means into a control pressure chamber and an atmospheric pressure chamber;
c. a second diaphragm dividing said second cavity means into a third chamber and a fourth chamber;
d. a bore communicating said atmospheric chamber with said third chamber;
e. valve operator means reciprocably movable in said bore with radial clearance, one end of said valve operator means disposed in said atmospheric pressure chamber in engagement with said first diaphragm, and having the other end thereof extensible into said third chamber to move said second diaphragm in response to pressurization of said control pressure chamber;
f. valve seat means in said fourth chamber;
g. an inlet port and an outlet port in said fourth chamber, one of which is surrounded by said valve seat;
h. a valve in said fourth chamber movable from a first seated position to a second unseated position, and vice versa, relative to said valve seat in response to reciprocable movement of said valve operator means and said second diaphragm;
i. said valve normally assuming one of said first and second positions when said fourth chamber is pressurized via said inlet port, and movable to the other of said first and second positions in response to movement of said valve operator means and said second diaphragm when said control pressure chamber is pressurized.

5. A valve device, as recited in claim 4, in which:
a. said valve seat surrounds said inlet port; and
b. said valve comprises a portion of said diaphragm.

6. A valve device, as recited in claim 1, in which a third diaphragm means divides said control pressure chamber into a first control pressure chamber and a second control pressure chamber, each operable when pressurized to dispose said valve operator means in said other position.

7. A valve device, as recited in claim 4, in which, a third diaphragm divides said control pressure chamber into a first and second pressure chamber, each operable when pressurized to dispose said operator means in said other position.

8. A valve device, as recited in claim 4, in which, a Belleville spring is disposed in said control pressure chamber biasing said valve operator means in a direction opposing pressure in said control pressure chamber.

9. A valve device, as recited in claim 4, in which:
a. said second cavity means is comprised of a third and fourth cavity intercommunicated via a second bore;
b. said second diaphragm divides said third cavity into said third and fourth chambers;
c. an auxiliary valve operator carried by said second diaphragm includes a portion reciprocably movable with radial clearance in said second bore;
d. said inlet is disposed in said fourth cavity; and e. the end of said second bore in said fourth cavity is surrounded by said valve seat.

10. A valve device, as recited in claim 8, in which:
a. a third diaphragm divides said fourth cavity into fifth and sixth chambers;
b. said third diaphragm having first and second portions;
c. said first portion of said third diaphragm overlying said valve seat and comprising said valve; and
d. said second portion of said third diaphragm having aperture means therethrough intercommunicating said fifth and sixth chambers.